US006234002B1

(12) United States Patent
Sisney et al.

(10) Patent No.: US 6,234,002 B1

(45) **Date of Patent: *May 22, 2001**

(54) APPARATUS AND METHODS FOR CLEANING AND TESTING FUEL INJECTORS

(76) Inventors: David W. Sisney, 3046 Spring Lake Dr., Rockford, IL (US) 61114; Paul E. Stauffer, 5812 Dorchester Dr., Rockford, IL (US) 61108

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/926,333

(22) Filed: Sep. 5, 1997

(51) Int. Cl.[7] .................................................. G01M 15/00

(52) U.S. Cl. ........................ 73/1.57; 73/119 A; 73/865.8; 239/106; 239/112; 239/113; 134/22.1; 134/22.11; 134/22.12; 134/22.18; 134/57 R; 134/58 R; 134/84; 134/89; 134/166 R; 134/169 R; 134/169 A; 134/23; 134/25.1

(58) Field of Search .............................. 73/119 A, 865.8; 239/106, 112, 113; 134/22.1, 22.11, 22.12, 22.18, 57 R, 58 R, 84, 88, 89, 166 R, 169 R, 169 A, 23, 25.1

(56) References Cited

U.S. PATENT DOCUMENTS 3,478,580 * 11/1969 Siemietkowski et al. ......... 73/119 R
4,088,012 * 5/1978 Emerson ............................ 73/119 R
4,218,744 * 8/1980 Pratt et al. ............................ 73/113
4,712,421 12/1987 Young .
4,756,186 * 7/1988 Sangawa ............................ 73/119 R
4,804,005 2/1989 Hartopp .
4,845,979 7/1989 Farenden et al. .
5,000,042 3/1991 Luebbering .
5,000,043 3/1991 Bunch, Jr. et al. .
5,020,362 6/1991 Hart et al. .
5,301,113 * 4/1994 To et al. ................................ 73/113
5,571,959 11/1996 Griggs .

* cited by examiner

*Primary Examiner*—Robert Raevis

(57) ABSTRACT

Automated apparatus and method to aid in the servicing of fuel injectors is adapted to be selectively operated in a test mode or a cleaning mode. The test mode senses flow rate through the injector and current draw of the injector solenoid, and provides the operator with visual indication and a printed record of the data. The cleaning mode begins with a testing sequence to record baseline flow and current draw data, cycles through predetermined cleaning steps including flowing a cleaning agent through the injector, checks the flow rate and current draw of the injector during and after the cleaning cycle, and repeats the testing sequence. This testing-cleaning cycle may be repeated until either the injector meets predefined performance criteria or until a pre-selected limit has been reached.

31 Claims, 14 Drawing Sheets

APPARATUS AND METHODS FOR CLEANING AND TESTING FUEL INJECTORS

BACKGROUND OF THE INVENTION

This invention relates generally to diagnostic equipment and service of fuel delivery units such as conventional solenoid-operated fuel injectors of the type commonly used in internal combustion engines and diesel engines, and in land, marine and other applications. More specifically, the invention relates to apparatus and methods for cleaning and testing the performance of such fuel injectors.

Fuel injectors of this type include a relatively small flow passage and a small in-line poppet valve that is pulsed open and closed at high frequency by an integral solenoid coil to provide fuel flow to the engine. Several known abnormal conditions in these components result in inefficient engine performance.

Fuel contaminants passing through the fuel filter may build-up in the passage of an injector and restrict fuel flow from that injector. Entrapment of such contaminants in the poppet valve may prevent the valve from fully closing, resulting in excess fuel flow. And electrical failure of the solenoid results in an inoperative injector, and again no fuel delivery from that injector. Each of these conditions may result in inefficient engine performance, from, among other things, an improper fuel-air interpretation and compensation in the engine.

Numerous prior devices have been utilized for checking the flow rate through fuel injectors and cleaning the injectors by flowing a cleaning agent therethrough in normal and sometimes reverse direction. One prior method for testing flow rate includes placing the injector into a device adapted to capture the output flow in a graduated cylinder. The flow rate is then determined by the volume of fluid collected in the cylinder over a measured period of time. See e.g., Bunch, U.S. Pat. No. 5,000,043. The method of flow measurement utilized in Hart et al., U.S. Pat. No. 5,020,326 includes taking pressure readings with a “standard” fuel injector and then comparing those pressure readings (or calculations therefrom) with data collected from injectors in the automobile. Hartopp, U.S. Pat. No. 4,804,005 discloses a device with a conventional mechanical flow meter that may be switched into and out of an injector fluid flow circuit for measuring the flow rate. The prior art also teaches apparatus and methods for verifying that the spray angle from an injector appears correct. See e.g., Griggs, U.S. Pat. No. 5,571,959. Unfortunately, these prior methods and devices for checking and cleaning fuel injectors are labor intensive, and require the vigilant observation and participation of a trained technician to obtain reasonably accurate and repeatable results.

In addition, verifying that the resistance of the solenoid coil is within pre-defined limits, and that the coil is functioning properly, is typically accomplished via conventional electrical testing on individual injectors, again requiring the active participation of the service technician.

SUMMARY OF THE INVENTION

The general aim of the present invention is to provide new and improved apparatus and methods for cleaning and testing the performance of fuel delivery units such as fuel injectors, the methods providing for and the apparatus being uniquely adapted for automated operation, for establishing relatively precise and repeatable data collection and performance verification, and for preferably providing both visual indication and a printed record of injector performance.

A detailed objective is to achieve the foregoing by providing apparatus for selective operation between a testing mode and a cleaning mode, either mode being conducted, including the printing of performance data upon completion, by simply selecting either the “test” position or the “clean” position of a control switch.

A more detailed objective is to provide a micro-controller programmed to control operation of the apparatus and injectors, the micro-controller being operably connected to an electronic flow sensor and to a current sensing circuit for detecting injector flow rate and solenoid current draw data, respectively.

These and other objectives and advantages of the invention will become more apparent from the following detailed description when taken in conjunction with the accompanying drawings.

In one embodiment of the invention, the apparatus includes, means for releasably receiving a plurality of fuel injectors, the switch to select either the test mode or clean mode of operation, and a fluid pumping system to provide a flow of cleaning fluid to the injectors. In this instance, an electric motor driven pump supplies pressurized cleaning fluid to a manifold which interconnects and supplies fluid to the injectors.

Automated control of the apparatus is accomplished with the pre-programmed micro-processor or micro-controller chip which energizes the injector solenoids in sequence, and according to the mode of operation selected.

The electronic flow meter is located in the fluid line between the pump and the manifold, and the current sensing circuit is wired to a common solenoid return wire. Visual display apparatus provide the service technician with continuous flow and current draw data from the flow and current detecting components. In addition, the flow and current data are periodically printed onto a paper strip to provide a permanent record of injector performance.

Figure 1:
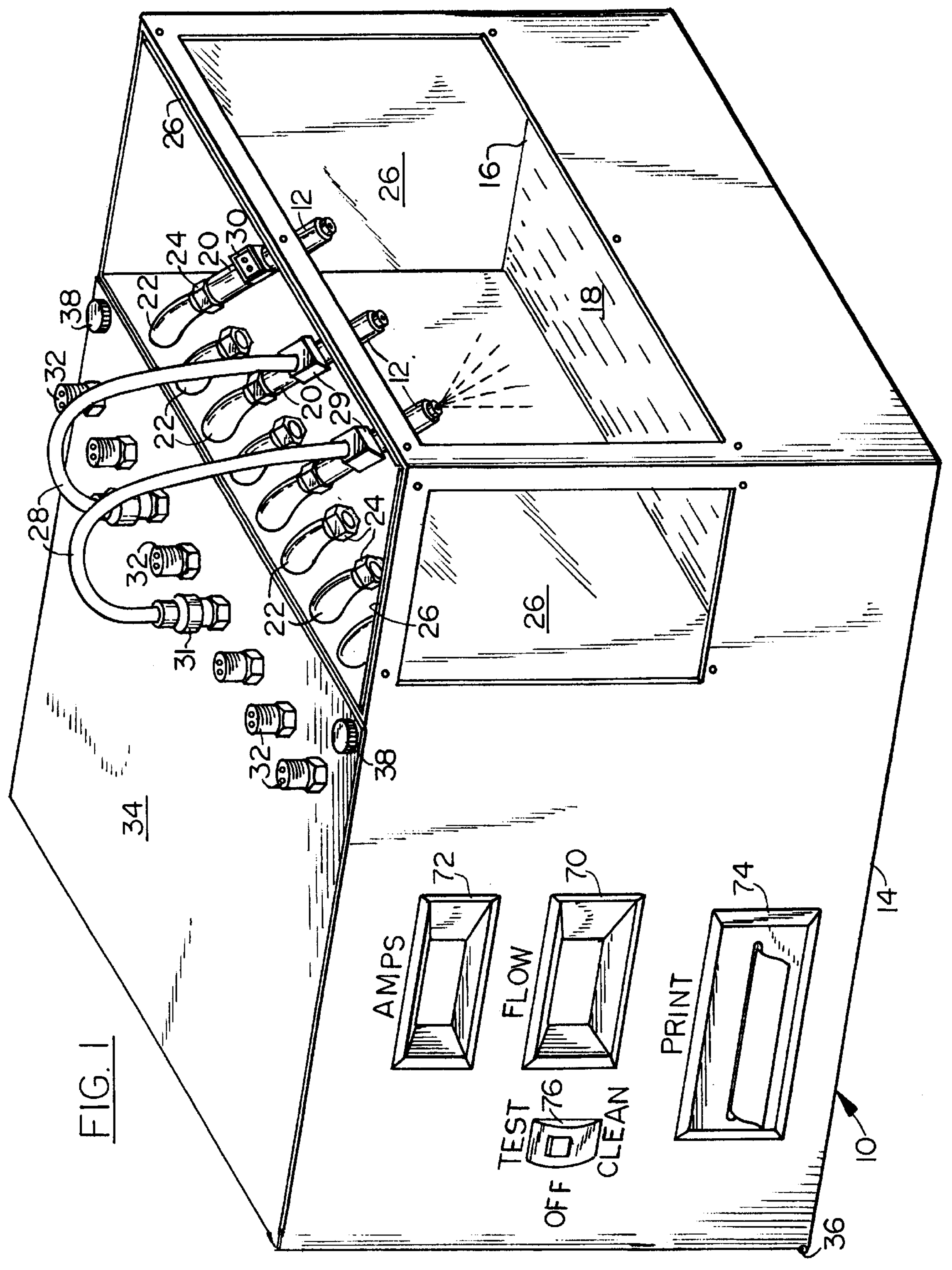
FIG. 1 is an isometric view of a new and improved fuel injector cleaning and testing apparatus embodying the unique aspects of the present invention, and showing fuel injectors installed therein.

While the invention is susceptible of various modifications and alternative methods and constructions, certain illustrated embodiments have been shown in the drawings and will be described below in detail. It should be understood, however, that there is no intention to limit the invention to the specific forms disclosed, but on the contrary, the intention is to cover all modifications, alternative methods and constructions, and equivalents falling within the spirit and scope of the invention.

DETAILED DESCRIPTION OF THE INVENTION

For purposes of illustration, the present invention is shown in the drawings as embodied in a portable diagnostic and service unit 10 (FIG. 1) adapted to clean and test fuel delivery units such as conventional solenoid-operated, electronically-controlled fuel injectors 12.

In general, the service unit 10 includes a housing 14 made from sheet metal or other rugged material suitable for use in a service environment, a station adapted to releasably receive a predetermined number of fuel injectors 12, a reservoir 16 adapted to hold a supply of cleaning fluid 18, and a fluid pumping system for providing a flow of the cleaning fluid to the fuel injectors. The cleaning fluid may a solvent based fluid such as conventionally used to clean injectors, or a detergent based fluid such as a product sold under the name Simple Green by Sunshine Makers Inc.

The injector receiving station includes a predetermined number of positions adapted to each receive an injector 12. To this end, adapters 20 are formed having downstream ends that provide a sealing interface to releasably receive the upstream end of the particular injector model to be installed therein. The upstream ends of the adapters 30 are preferably connected to tubes 22 via conventional quick-release coupling means 24. In this way, interchangeable adapters 20 for various model injectors may be made available to enable testing and cleaning of different model fuel injectors with one service unit 10.

Figure 4:
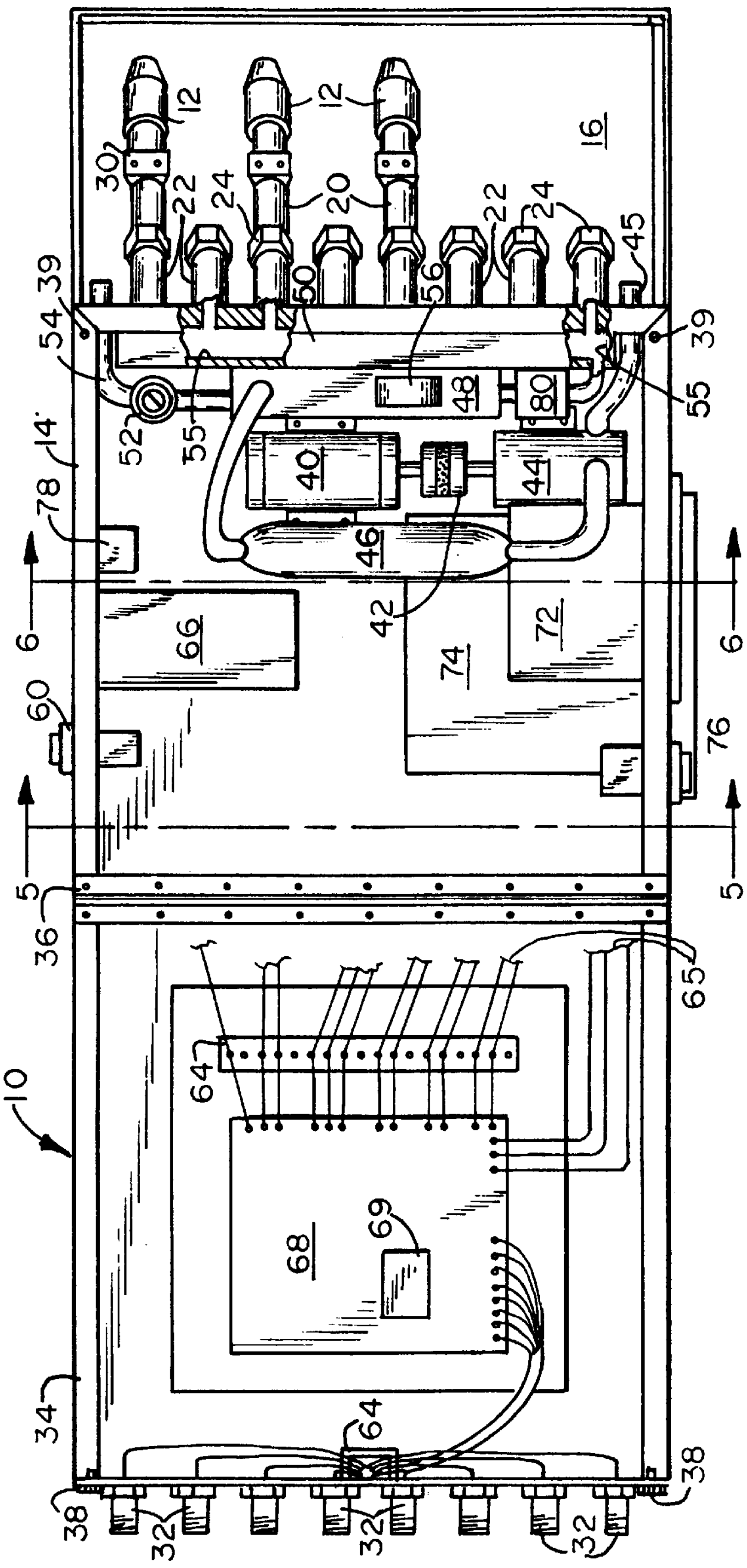
FIG. 4 is a top view of the apparatus as shown in FIG. 3.

Tubes 22 of the injector receiving station extend outwardly from a fluid manifold 50 (FIG. 4) and slope downwardly such that the fuel injectors 12 are positioned to spray fluid into the reservoir 16 when energized. Clear panels 26 made from Plexiglas or like material generally surround the injector receiving station to enable a service technician to observe the fluid spray pattern from the injectors. Connector ends 29 of electrical cords 28 connect electrical terminals 30 of the fuel injectors with the electrical system of the service unit 10.

Figure 2:
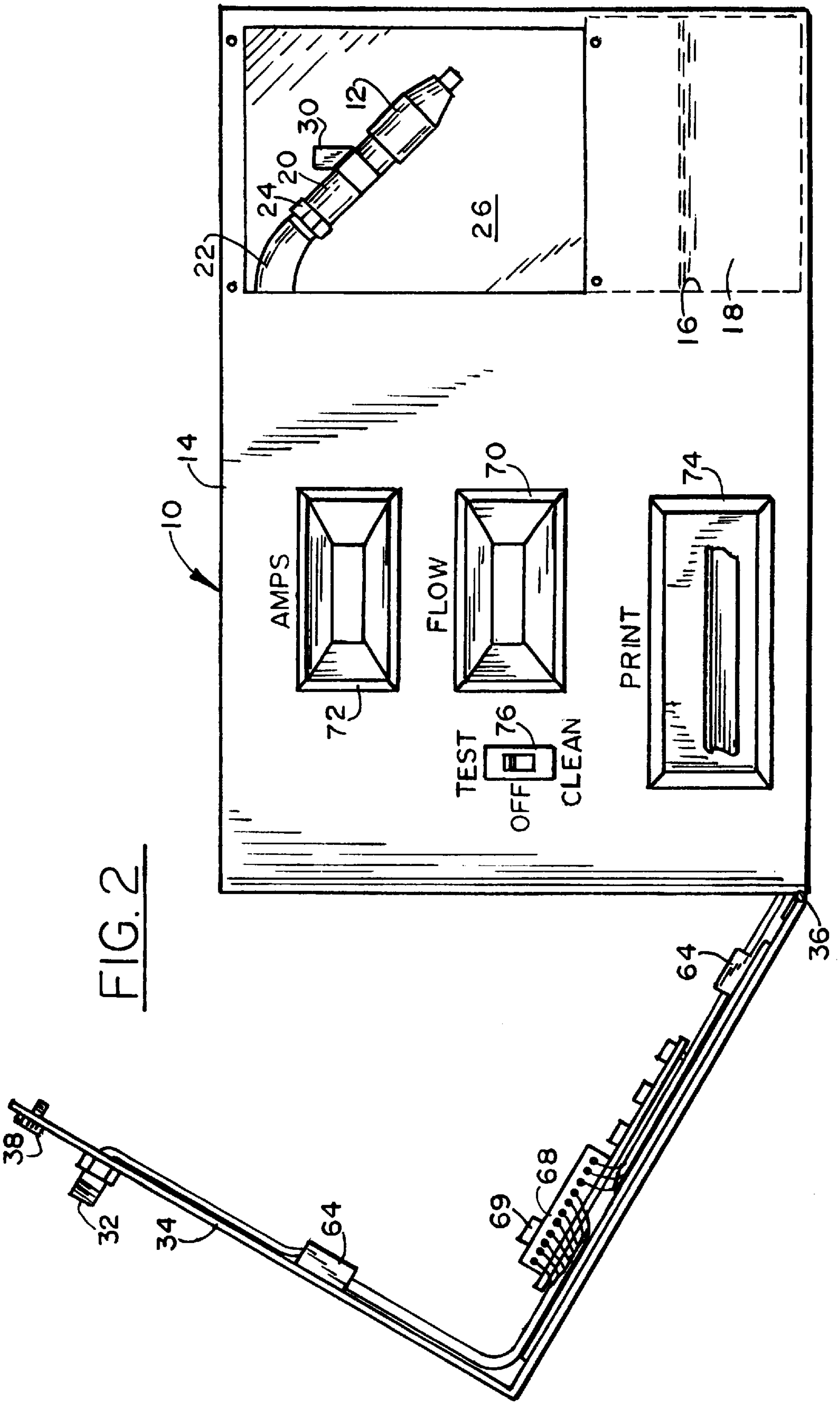
FIGS. 2 and 3 are side views of the apparatus of FIG. 1 but showing an access panel partially and then fully opened, respectively, for access to the internal components.
Figure 3:
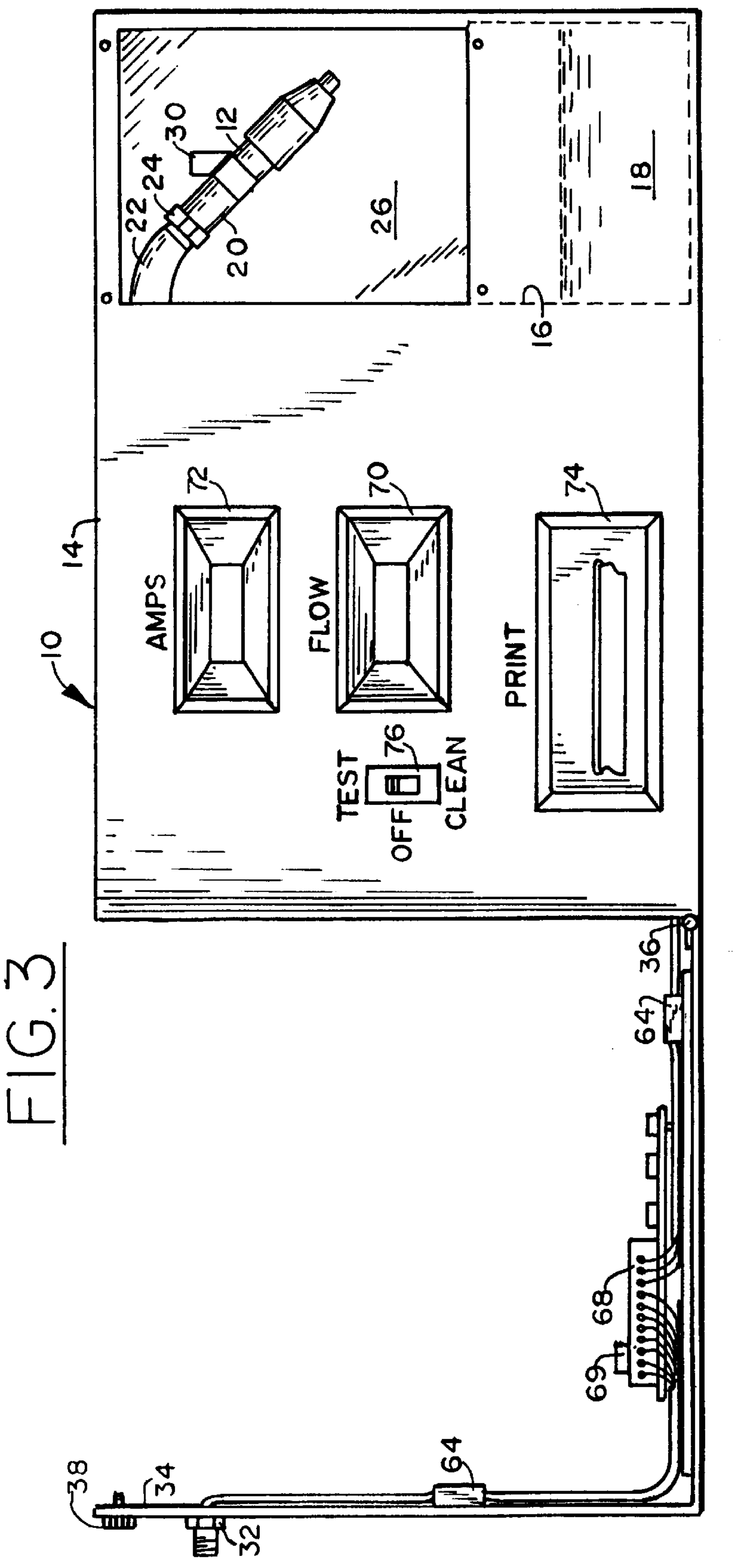

The housing 14 includes an access panel 34 (FIG. 2) which, in the present instance, includes integrally formed upper and left side panels, and which is hinged at 36 to provide access to the internal components of the service unit 10. Thumb screws 38 and threaded openings 39 (FIG. 4) secure the access panel into the closed position as shown in FIG. 1. Threaded electrical connectors 32 secured to the access panel and mating connectors enable the electric cords 28 to be removed from the service unit when not in use.

Figure 6:
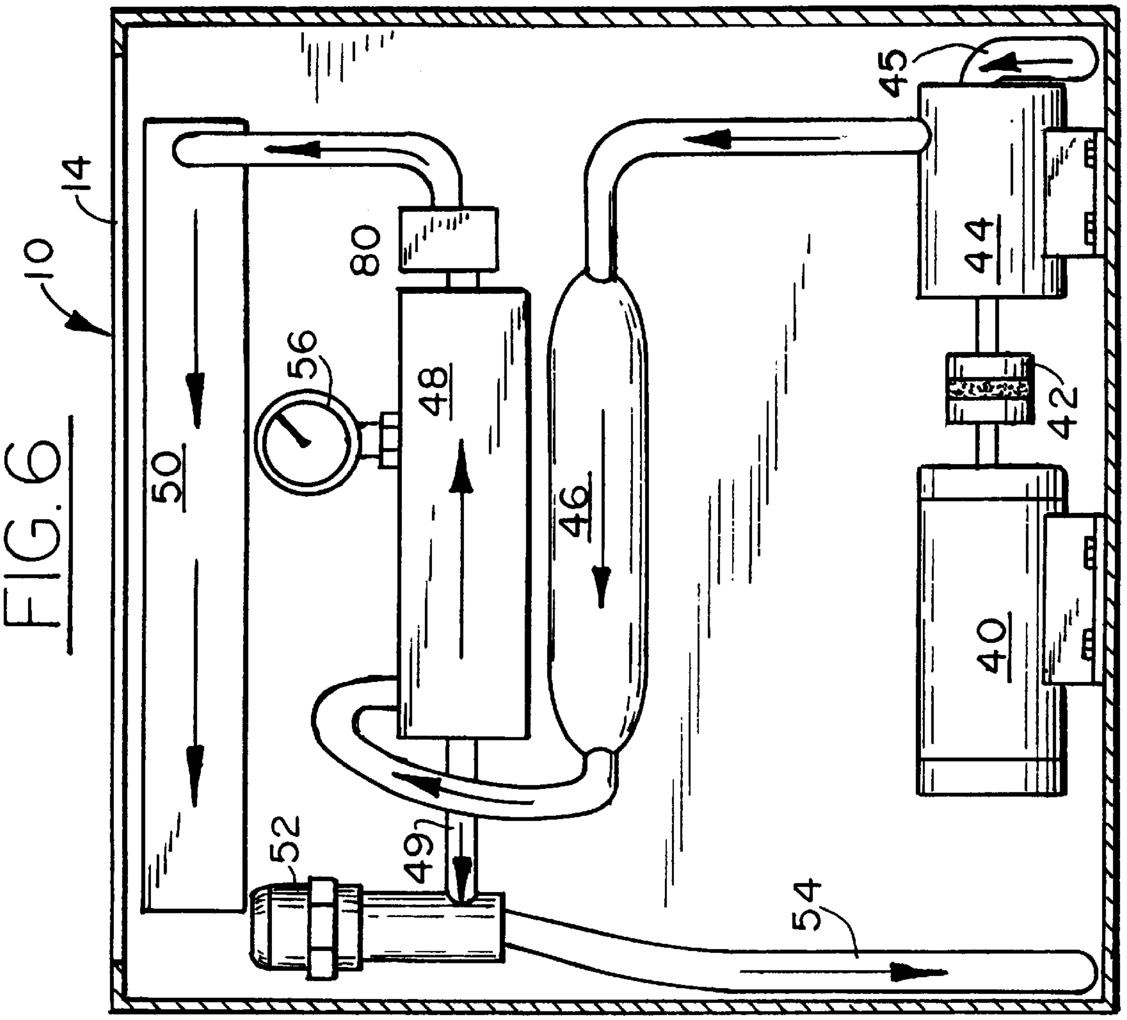
Figure 7:
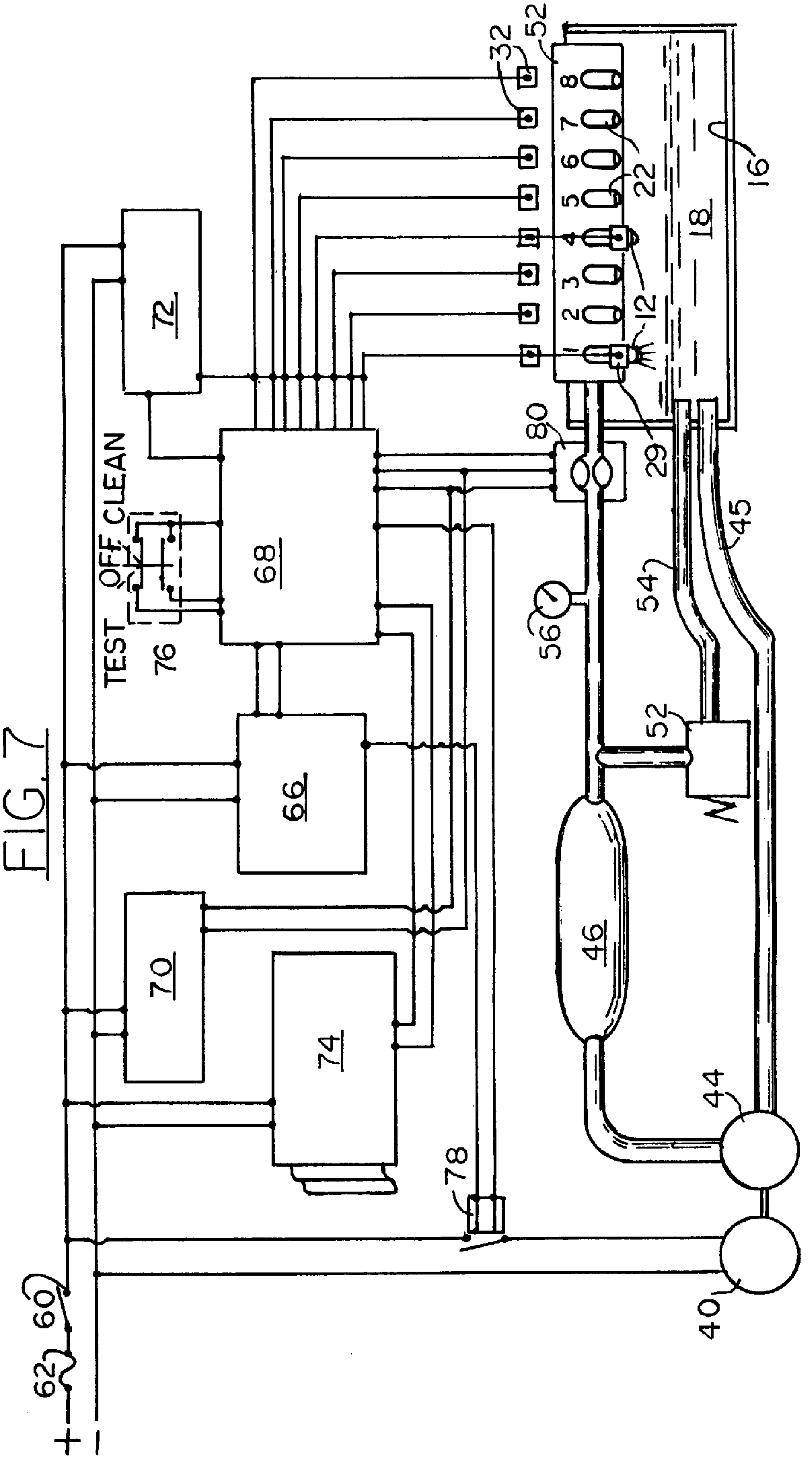
FIG. 7 is a combined diagrammatic view of the electrical and fluid systems of the apparatus of FIG. 1.

As best seen in FIG. 6, and as depicted in diagrammatic form in FIG. 7, the fluid system includes an electric motor 40 connected via coupling 42 to a rotary pump 44 for supplying pressurized fluid to the injectors 12. The cleaning fluid 18 is drawn from the reservoir 16 into the pump through tubing 45, is pumped through an accumulator 46 adapted to suppress fluid noise and pressure spikes in the system, through a fluid connection block 48, and into the manifold 50 for distribution to the tubes 22. The tubes 22 are in fluid communication in the manifold via passage 55 (FIG. 4) such that all tubes 22 are pressurized simultaneously. A check valve mechanism (not shown) internal to the conventional quick-connect coupling mechanism 24 prevents fluid flow through the tubes 22 in those positions where an injector has not been installed.

A pressure relief valve 52 regulates the pressure in the fluid system by continuously bleeding-off fluid from the connecting block 48 via tube 49 and returning the fluid into the reservoir 16 through tube 54. A pressure gauge 56 threaded into connecting block 48 facilitates setting the pressure relief valve to a desired regulation pressure, typically during initial assembly and maintenance of the service unit 10.

Figure 5:
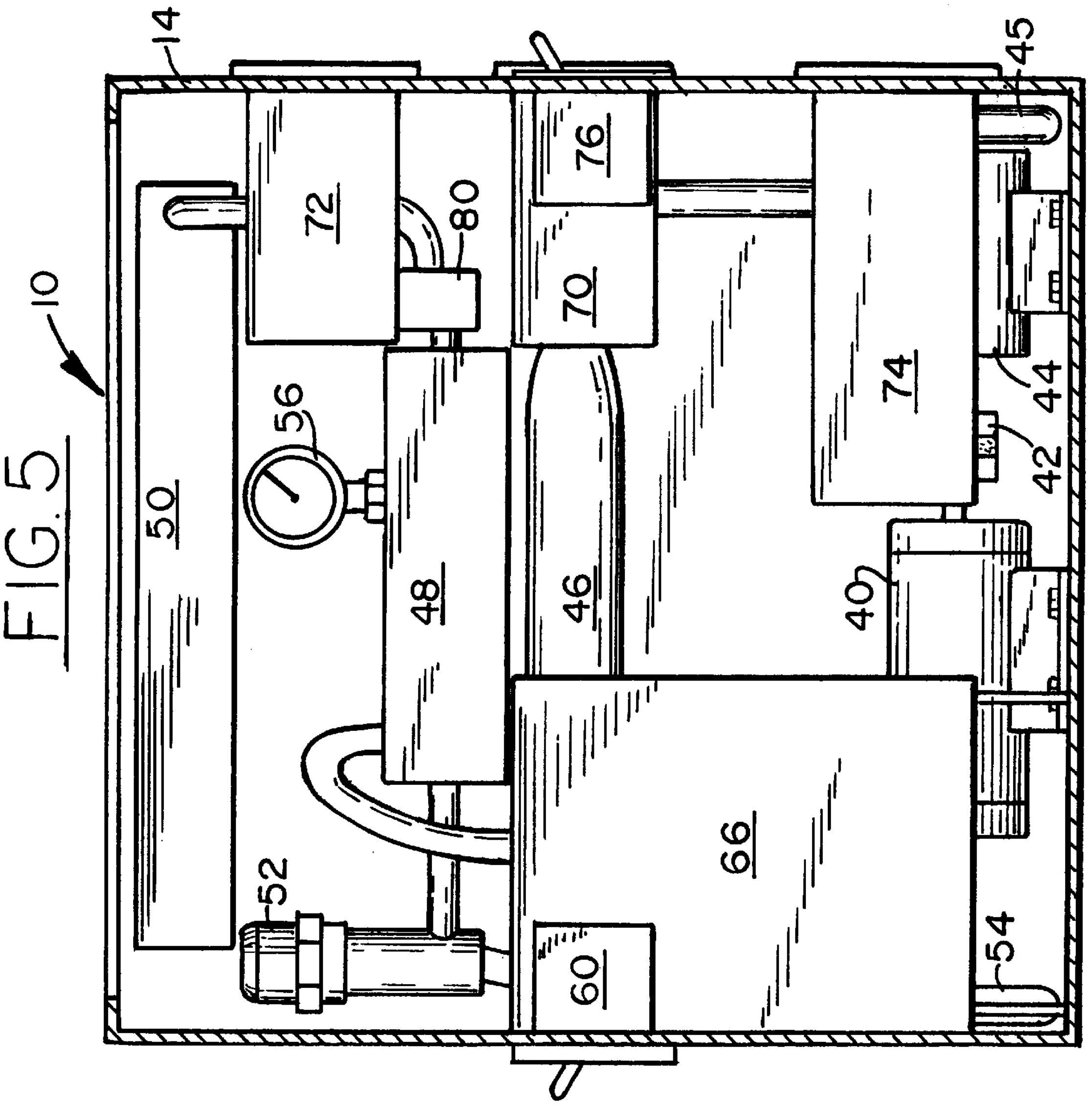
FIGS. 5 and 6 are views taken substantially along the lines 5—5 and 6—6, respectively, of FIG. 4.
Figure 8:
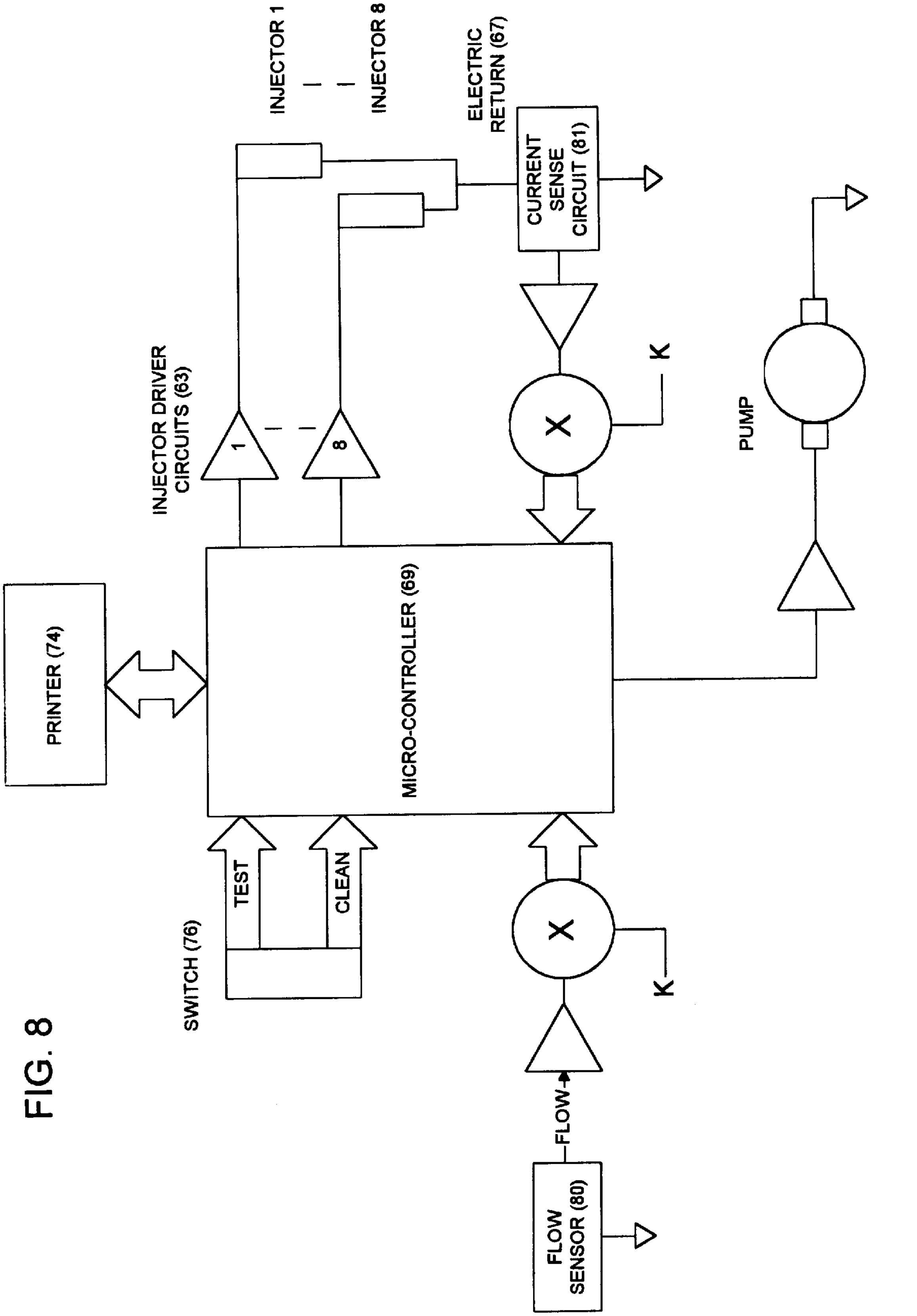
FIG. 8 is a block diagram of and primary interfaces for the micro-controller of the apparatus of FIG. 1.

AC electric power is supplied to the service unit 10 through a fuse 62 (FIG. 7) and an optional on-off switch 60 (FIG. 5), to the motor 40, and to a power supply 66 for supplying 12 VDC to a printed circuit board 68 equipped with injector driver circuits 63 (FIG. 8). Terminal blocks 64 used for electrical component inter-connections provide for ease of component replacement during maintenance of the service unit. For clarity in FIG. 4, the electrical wiring from the circuit board to the internal components is shown disconnected at 65, but is, of course, connected as indicated diagramatically in FIG. 7.

In accordance with the present invention, the service unit 10 is uniquely adapted to (1) test and record the performance of fuel injectors without the aid of a service technician, (2) cycle through an automated cleaning sequence for cleaning the fuel injectors, (3) automatically cycle from the cleaning sequence to the testing mode to check and record the performance of the injectors after having been cleaned, and (4) provide a printed record of injector performance data preferably with accept/reject test performance criteria. As a result, the service unit is capable of substantially unattended operation, and is operable to identify whether injectors meet certain predetermined performance criteria without observation by or the active participation of a service technician.

In general, the testing mode of operation utilizes a sequence of steps to determine if the injector current draw and fluid flow rate are within predetermined limits. The automated cleaning mode preferably begins with a test cycle, followed by at least one cleaning cycle, and concluding with a test cycle, after which injector performance data is printed. In the event that any of the injectors fail to meet the test performance criteria, the clean-test sequence may be repeated until acceptance criteria is met or until further improvement is no longer achieved with additional cleaning. A switch 76 enables the service technician to select from either the testing mode of operation or the automated cleaning mode of operation.

In carrying out the invention, a micro-processor or microcontroller chip 69 (FIG. 8) mounted on the circuit board 68 processes inputs and outputs discussed further below, and uses software code to establish process control and operational sequences of the service unit 10, the code being stored in programmable memory in the controller chip. The controller is operably connected to the selector switch 76 and selectively operates in either the test mode or clean mode in response to actuation of the switch. The primary interfaces for the controller are illustrated in the block diagram of FIG. 8. As indicated, the controller drives (i) a solid state relay 78 (FIG. 7) to start the pump, (ii) injector driver circuits 63 to selectively energize the injectors, and (iii) a printer 74 through, for example, a serial communications interface, and receives input signals associated with solenoid current draw and injector fluid flow rates.

An electronic flow sensor or flow meter 80 provides analog flow rate data to the controller 69. Specifically, the flow sensor generates an output voltage signal associated with the measured flow rate and is wired to the circuit board 68 for communication of the flow rate indicating signal to the controller. In the embodiment shown, the flow sensor is positioned in the fluid line upstream of the manifold 50.

A resistor network circuit 81 adapted to sense and measure the current draw of the injector solenoids is included on the circuit board 68. This current sensing circuit is in series with a common electrical return 67 from the injector solenoids, and is operably connected to the micro-controller 69 to provide the controller with analog current draw information. A voltage regulator (not shown) located on the circuit board provides a stabilized voltage supply from the 12V power supply 66 to the controller.

Advantageously, the arrangement of the flow sensor 80 and the current sensing circuit 81, combined with sequential operation of the injectors 12 as further discussed below enables one flow meter and one current sensing circuit to measure the flow and current draw for all injectors installed in the service unit 10.

Figure 9:
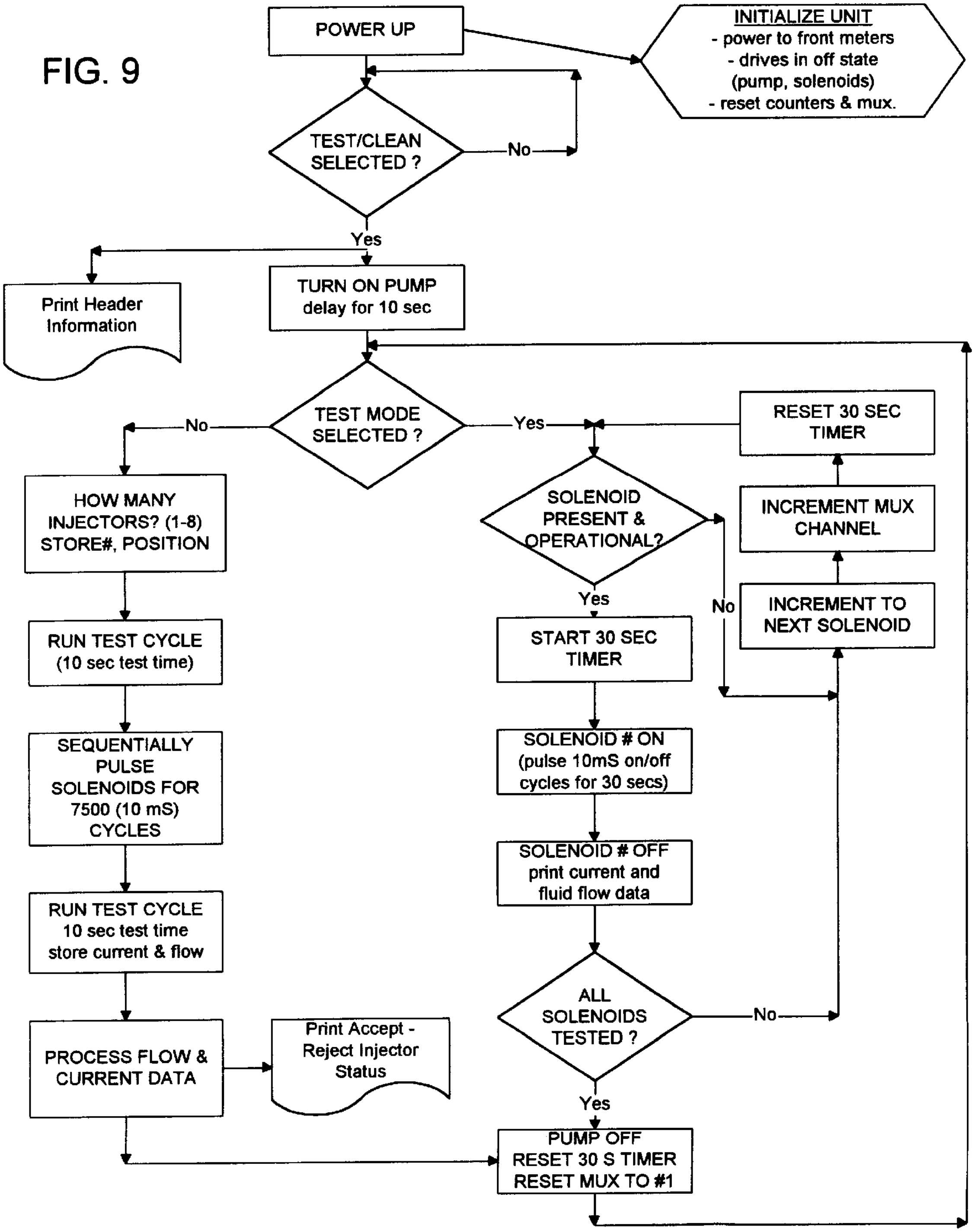
FIG. 9 is a diagrammatic flow chart of the control logic of one embodiment of the invention.

The operation of the controller 69 is best understood with reference to FIG. 8 and the flow chart of FIG. 9. When the selector switch 76 is actuated for either the “Test” or “Clean” mode of operation, the controller executes an initialization phase including printing header information onto the paper record, turning the motor 40 on, and providing for brief time delay to allow for circuit board and printer reset and to allow the pressure in the fluid system to stabilize.

If the “Test” mode is selected, the controller 69 causes the associated injector driver circuit 63 to energize the injector 12 in position #1, or the first position with an injector, with a pulse voltage of 10 milliseconds (mS) on/off cycles at 12 VDC for 30 seconds. After subjecting the injector to such simulated operating conditions, the first injector solenoid is de-energized, and the flow rate and current draw information are sent to the printer 74 for printing. The controller then cycles through the remaining injectors, one at a time, until all injectors have been tested, and the associated flow and current data collected and printed. The controller also detects a shorted or open condition in a solenoid, and prints such condition on the record.

In the test mode of FIG. 9, the controller checks each of the positions 1–8 for the presence of a potentially operational injector, i.e., an electrically operational solenoid, before sending the pulse operating voltage to that position. Specifically, the controller sends a low level electrical signal such as 50 milli-Amp to the position in question and checks for continuity as indicated by the current sensing circuit 81. If continuity is established, the injector in that position is then tested as described above. If continuity is not established, a counter in the controller increments and the controller proceeds to check the next position for the presence of an injector. The controller detects a shorted condition by comparing the driving current signal with the current sensing signal and skips testing shorted injectors. This sequence begins with the first position and continues until all eight positions have been checked and if operational the injectors installed therein tested.

If the test results indicate that all injectors 12 meet predetermined test performance criteria, the injectors may be removed for re-installation into an engine. If, on the other hand, the injectors do not meet the desired flow criteria, the service technician may execute the automated cleaning mode of operation. An injector with a shorted or open electrical failure as indicated by the printed performance data would typically be removed prior to the cleaning operation.

It is noted that the controller 69 will interpret a lack of continuity at a particular injector position as an absence of an operational injector. In the event that an installed injector is not tested by the service unit, the technician would typically check to see that the electrical cable 28 has been properly installed before removing the injector from the service unit.

Actuation of the switch 76 to the “Clean” position begins the automated cleaning of the injectors 12. This mode of operation begins with a test cycle as described above to establish pre-cleaning performance, followed by a cleaning cycle. In general, the cleaning cycle consists of sequential operation of the injectors as during testing cycle, but for a longer period of time to permit removal of deposits by the cleaning fluid. In the embodiment shown, the controller sequentially operates the injector positions 1 through 8 (or those positions with operation injectors installed therein) with 10 milli-second pulses. The sequential operation of the injectors is repeated for 7500 cycles of flowing cleaning fluid through the injectors. At the completion of the cleaning cycle, another test cycle is run on the injectors and the flow and current data for that test cycle is printed.

In the cleaning process of FIG. 9, the controller 69 initially determines in which position potentially operational injectors 12 are installed. The controller sequentially powers the eight identical injector drive circuits 63 with a low level electrical signal, monitors the current sensing circuit for continuity and for a shorted condition, and thus determines in which positions potentially operational injectors 12 are installed. The controller then stores this information in a register as true/false type data, and energizes only those positions with potentially operational injectors during the subsequent testing and cleaning sequences.

In a preferred embodiment, the controller 69 is preferably adapted to print accept/reject status for each of the injectors after the automated cleaning cycle. To this end, the controller 69 (i) stores the flow and current data, and associated position information in memory typically provided in the controller chip, (ii) is programmed to calculate mean or average flow and current performance values based on the population of injectors tested, (iii) performs a comparison of the stored data from each of the injectors with the calculated mean values, (iv) identifies those injectors having either flow or current data deviating, for example, greater than ± five percent from the mean, and (v) prints accept/reject status for each of the injectors based on this comparison, those injectors having a deviation greater than said predetermined deviation being rejected. Comparison criteria such as this type is especially useful considering the large variety of injector models currently available and models that will become available in the future, the differing viscosity of the suitable cleaning fluids available, and the possible unavailability of published performance data with specific cleaning fluids for particular injector models to be tested.

Figure 10:
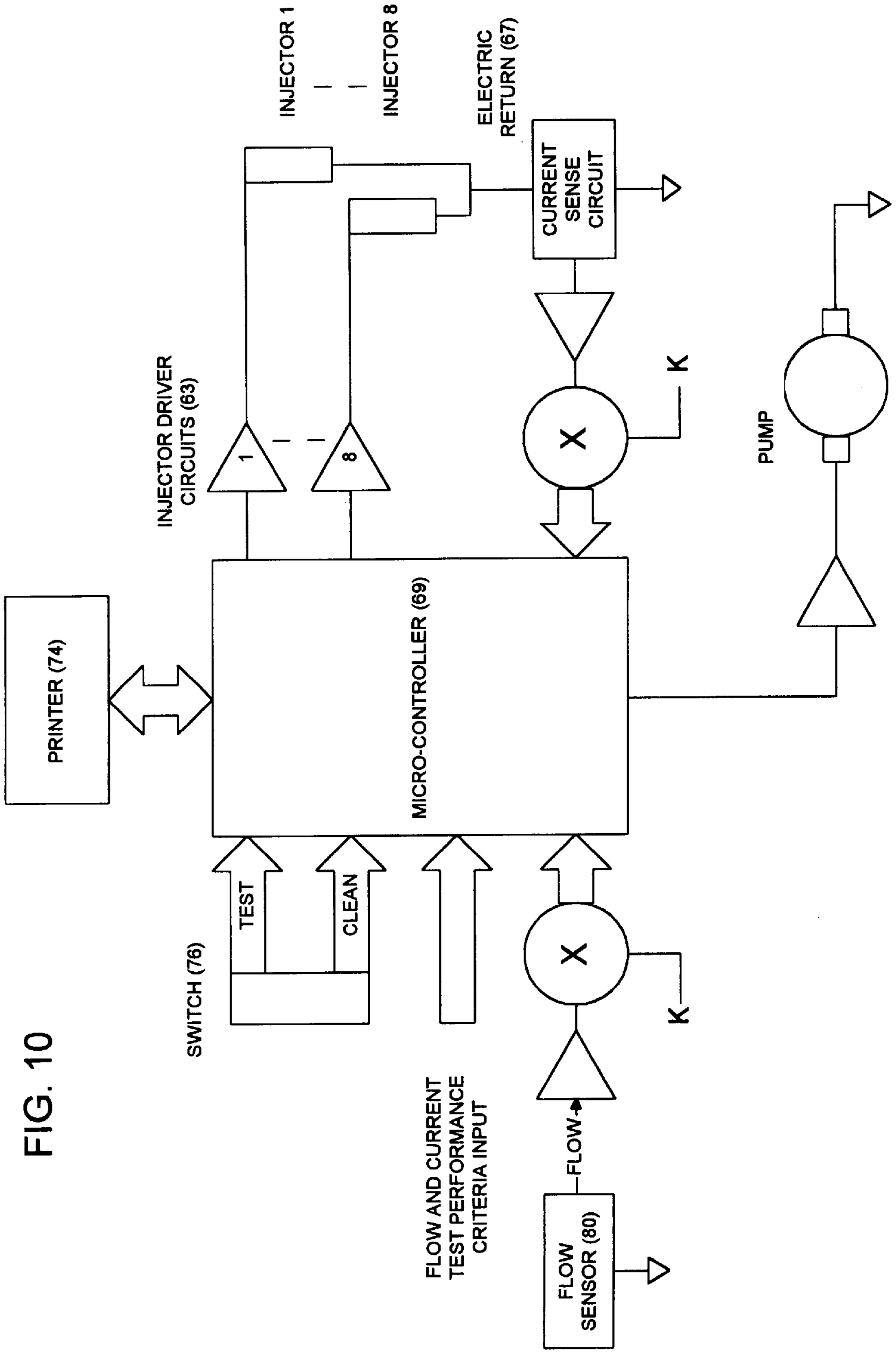
FIGS. 10–12 are block diagrams of and primary interfaces for micro-controllers of alternate embodiments.

In an alternate embodiment (see FIG. 10), the service unit 10 includes means for manually setting the nominal flow and current acceptance criteria for the particular injector model to be tested. More specifically, the unit is provided with adjustable electrical apparatus electrically connected to the controller 69 and adapted to provided the controller with voltage or current electrical signals associated with the desired nominal flow and current performance criteria, the level of the provided signals corresponding to the desired performance criteria according to predetermined relationships. Such an input signal apparatus may be an analog-type device such as a manually adjustable dial apparatus, a digital input device such as a touch-screen or touch-pad, or any suitable device operably connected to the controller and adapted to provide input signals for establishing test performance criteria. In this instance, the controller processes the input signals to determine the test performance criteria, compares the measured flow and current draw data with the performance criteria values as set by the service technician prior to the test, and determines accept/reject status of the injectors 12 based on this comparison and deviation from the performance criteria. Such an arrangement is suitable if specific fluid flow test criteria is available for the injector models to be tested and for the cleaning fluid used in the service unit.

The flow and current test criteria for the injectors 12 may also be established by way of tabulated data for each of the injector models tested. The service technician would compare the actual performance data on the printed record with the tabulated data to determine Accept/Reject status for each injector. In this instance, the controller is programmed to simply print the flow and current test results. Alternately, the service unit may include switch means (not shown) operably connected to the controller for selectively printing the raw performance data or operating in an automated comparison mode to determine accept/reject status.

It is known that an uncorrected low flow condition may result from a persistent contaminant deposit in the injector 12. A low flow condition may also result from low current draw in the solenoid, the solenoid thus being unable to open the poppet valve to its normal operating position due to shorting of some of the coil wires. Advantageously, low current draw will be identified in the data print-out provided by the service unit 10 to aid in distinguishing between these two conditions. Moreover, the low current draw data will provide an early warning of partially shorted coils in those injectors that may still meet the flow test criteria.

In keeping with the invention, the service unit 10 includes visual display means for providing continuous visual indication of the flow and current draw throughout the testing cycle. To this end, the service unit shown includes a volt meter 70 and an amp meter 72. The volt meter is electrically connected to the flow meter 80, and is calibrated to continuously display the flow rate associated with the electrical output signal from the flow meter. The amp meter 72 is electrically connected to the common solenoid return wire 67 to provide visual display of injector current draw. As a result, the service technician is provided with continuous flow and current test performance indication for each of the injectors 12.

Advantageously, continuously monitoring the flow and current draw data aids in identifying abnormal conditions not readily apparent from the discrete flow and current data sampled and printed by the controller. For example, failure of an internal seal between the solenoid coil and the fluid passage in the injector may result in shortened injector life expectancy. Such a failure affects the flux resistance of the electromagnetic circuit in the injector, but would not be detected by prior methods for servicing injectors. Such a failure, however, may be detected by continuously monitoring the current draw data of the display 72. Thus, continuously monitoring injector performance aids in identifying unusual electrical and flow related performance abnormalities.

Figure 12:
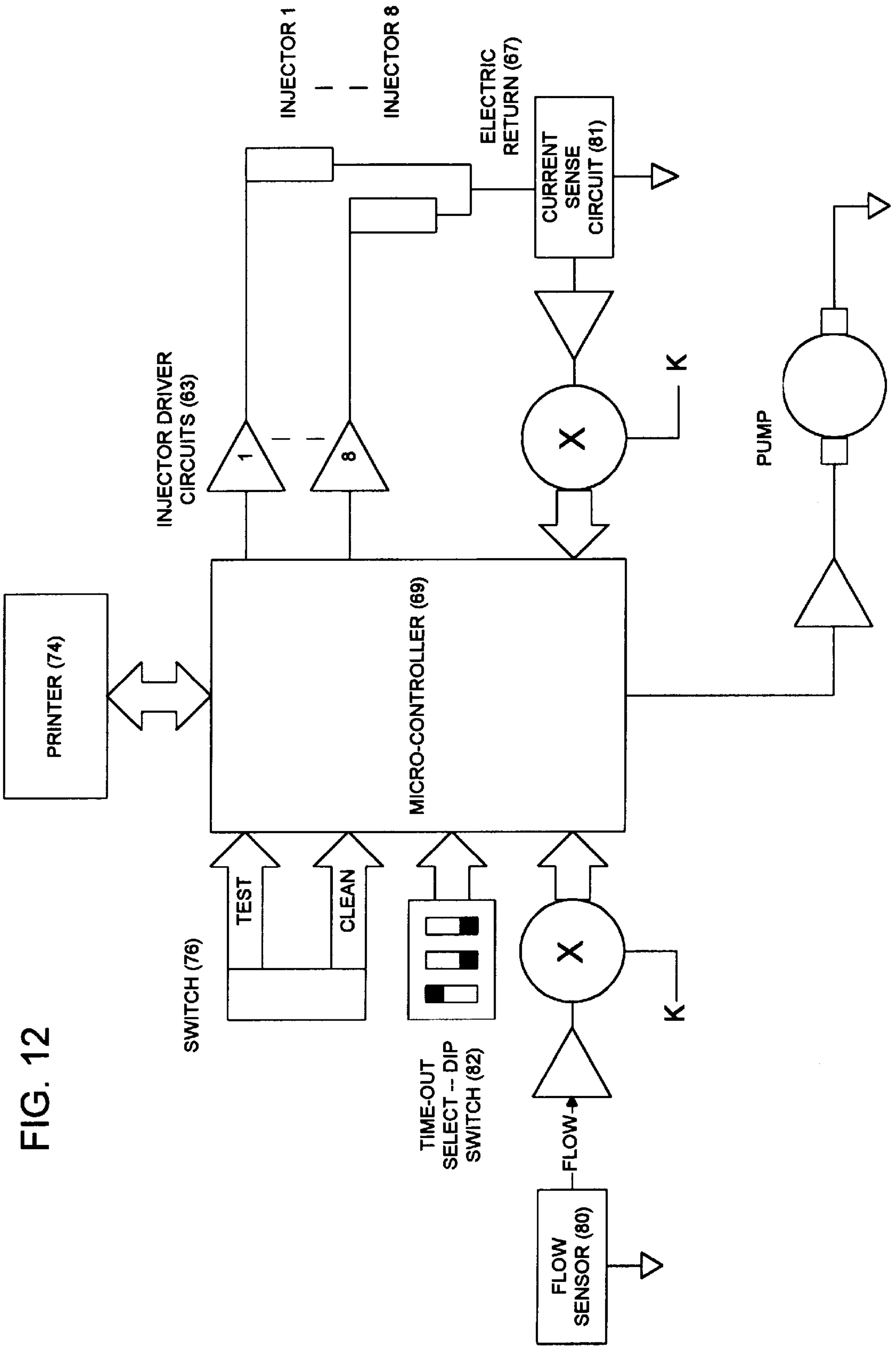
Figure 13A:
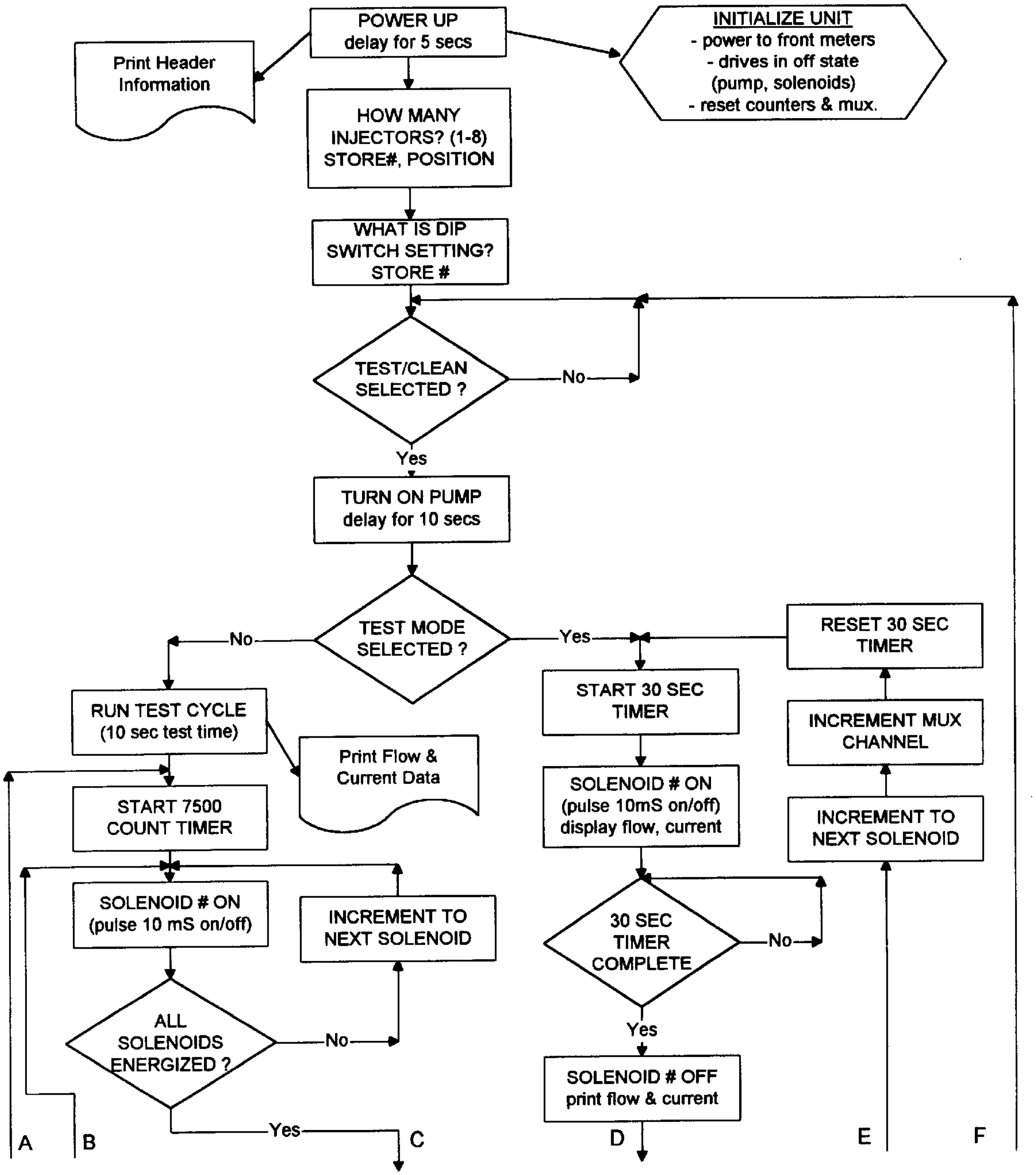
FIG. 13 is a diagrammatic software control logic flow chart of the embodiment of FIG. 12.
Figure 13B:
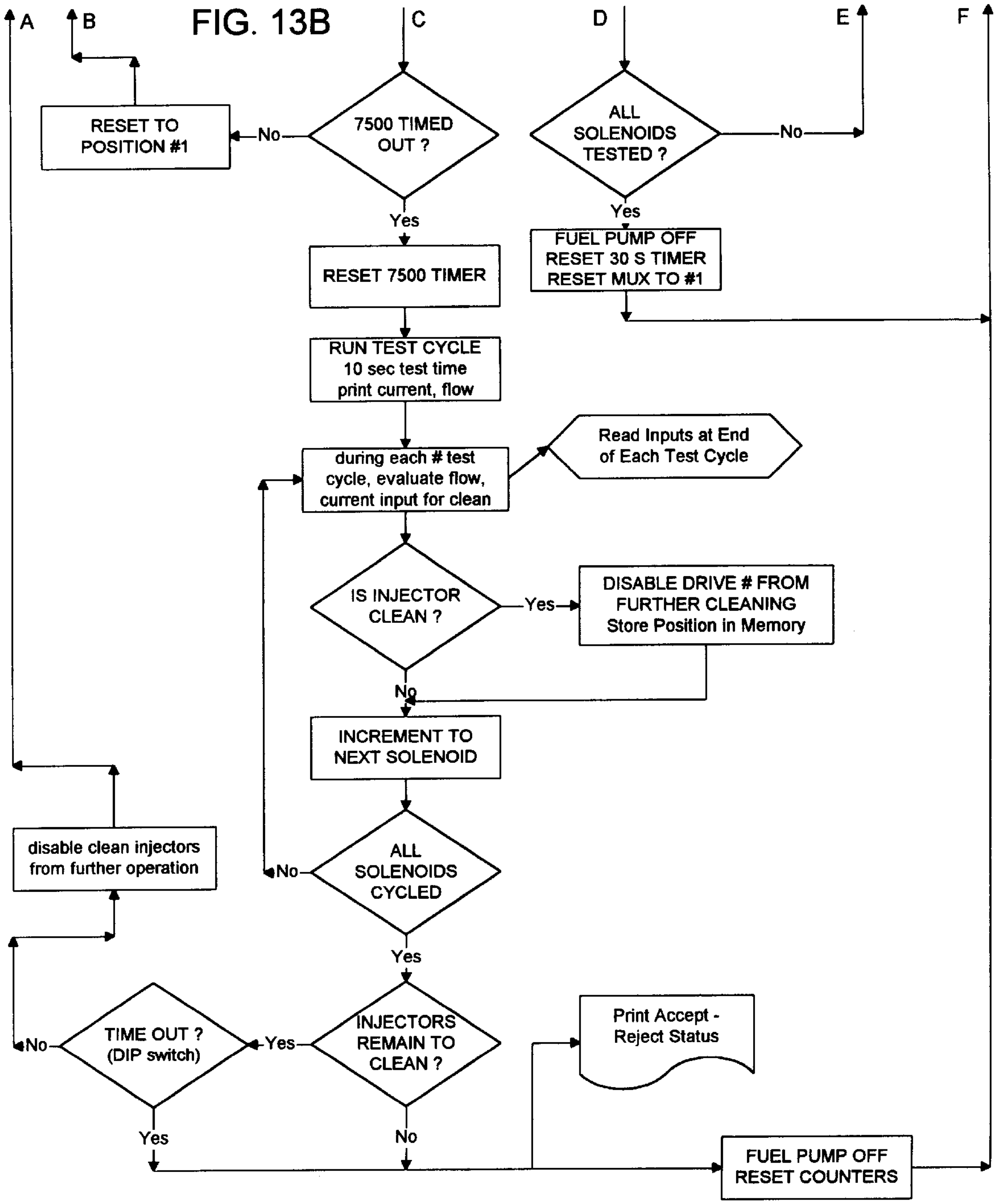

In an alternate embodiment (see FIGS. 12 and 13), the service unit 10 is adapted to compare the actual flow performance data with pre-established test criteria, if the test criteria is not met, automatically repeat the clean/test cycle until either the test criteria is met by all injectors, or a predetermined maximum number of clean/test cycles has been conducted. In this instance, as indicated in FIG. 13, the controller is programmed to store the position of injectors meeting the test criteria and disable subsequent cleaning on those injectors, and a DIP switch 82 electrically connected to the controller is set, typically during assembly or maintenance of the service unit, to correspond with a maximum number of clean/test cycles to be run.

Figure 11:
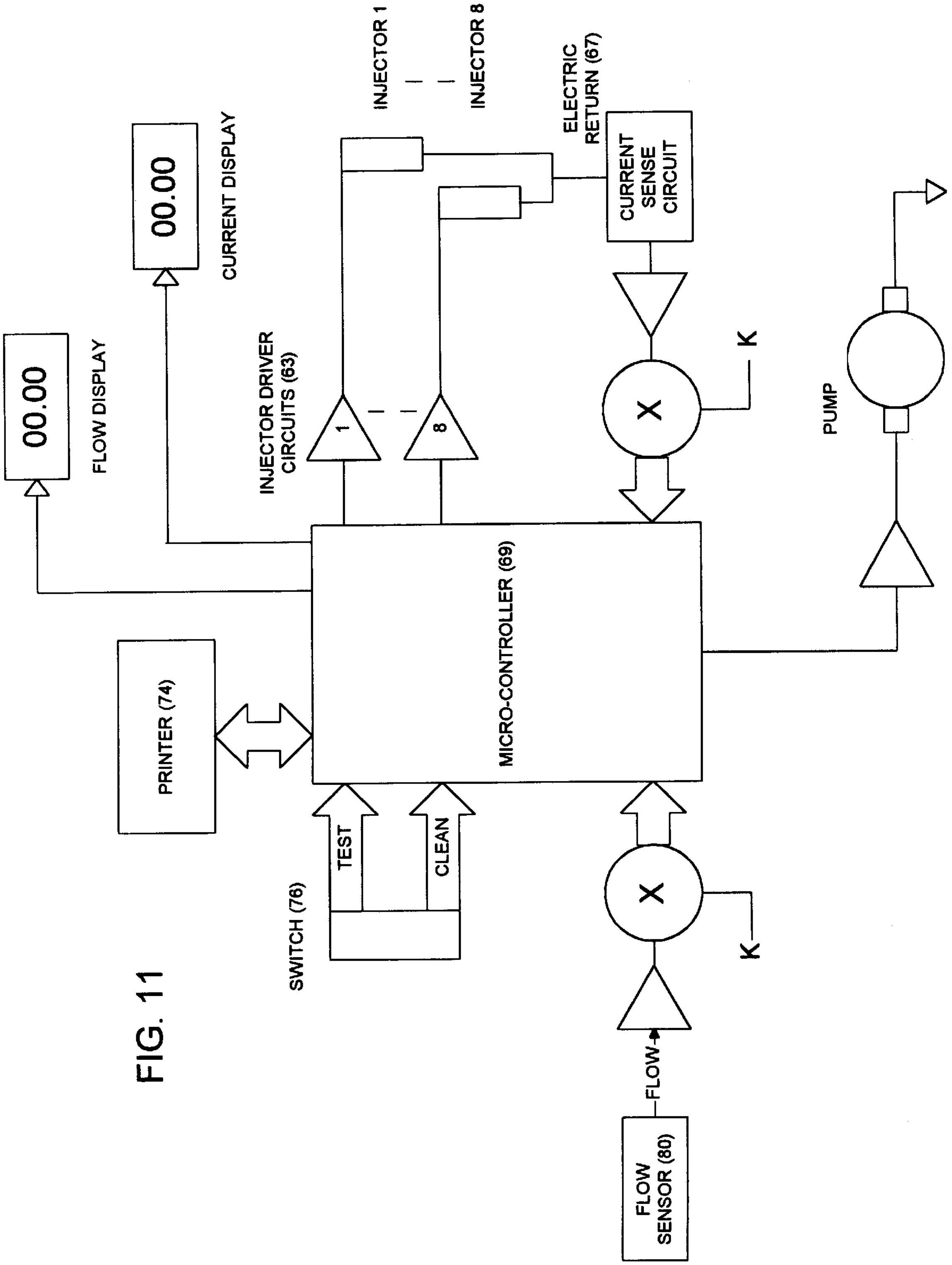

It will be apparent to one skilled in the art that the service unit 10 may include additional alternate embodiments in addition to the ones discussed above and shown herein while remaining within the scope of the present invention. For example, the unit may include light-emitting diodes or other means for visually indicating accept/reject status for each of the injector positions. The cleaning-testing cycle of FIG. 9 may be automatically repeated at least two times before the controller determines the mean operating values and the accept/reject test status established. The meters 70 and 72 may be replaced with digital displays (FIG. 11) that are driven by the controller based on the current and flow indicating signals received from the flow meter 80 and the current sensing circuit 81. The testing and cleaning duty cycles may be adjusted as desired, or as experience suggests, such as flowing cleaning fluid through the injectors with the poppet valve full-open. Providing for flow meters and current sensing circuits for each of the injector receiving positions will enable simultaneous testing and cleaning of the injectors. Providing for a closed fluid pumping system, a sealing interface for the injector outlet ends, and means for selectively pumping the cleaning fluid through the injectors in the reverse direction enables known reverse flow cleaning techniques to be utilized with the present invention. To provide the service technician with a record of the flow and current data throughout the testing and cleaning modes of operation, means such as a strip chart recorder may be provided in the service unit. Alternately, the controller 69 may be programmed to simply print data points at predetermined intervals during the testing and cleaning cycles. Alternate comparison criteria may be programmed or utilized, and means may be provided for establishing alternate deviation acceptance criteria. Or the controller may be programmed to automatically transition to the cleaning mode if an initial testing indicates sub-par performance. Clearly, the controller 69 may be programmed to sequence the testing and cleaning modes of operation other than as discussed above.

From the foregoing, it is apparent that the present invention brings to the art a new and improved service unit 10 that is uniquely adapted to enhance diagnostic service and repair efficiency in correcting engine performance problems related to malfunctioning fuel delivery units such as fuel injectors 12. By virtue of the programmable microcontroller 69 adapted to operate the injectors according to a pre-programmed schedule, and to process input signals from the electronic flow sensor 80 and the current sensing circuit 81, performance testing and/or automated cleaning of the injectors, including automated data collection and providing of a printed data record, is accomplished by simply installing the injectors into the service unit and selecting the desired mode of operation. As a result, the service unit and methods embodied therewith enable testing and cleaning of injectors without active observation or participation by the service technician, and thus provides a cost effective means for testing and cleaning fuel injectors. Advantageously, continuous data display is also provided for optional observation to aid in diagnosing and servicing malfunctioning fuel injectors.

What is claimed is:

1. A portable service device for use with fuel injectors, said device comprising:

a housing;

a fluid manifold connected to said housing said manifold having an inlet opening and having a plurality of outlet openings in fluid communication with said inlet opening;

coupling means connected to said outlet openings, said coupling means being adapted to releasably receive injectors for testing;

a reservoir of cleaning fluid in said housing;

a pump connected to said housing, said pump having inlet tube means connected to said reservoir for drawing fluid therefrom and having outlet tube means in communication with the inlet of said manifold to provide a flow of cleaning fluid to those injectors installed into said coupling means, said installed injectors discharging the cleaning fluid flowing therethrough into said reservoir for recirculation of the cleaning fluid;

electrical power means;

electronic control means operably associated with said electric power means and said installed injectors for selectively and automatically energizing said injectors according to a pre-defined sequencing schedule;

means connected between said pump and said installed injectors for detecting the fluid flow rate through each of said injectors, said flow detection means being adapted to provide electrical output signals for each of the fluid flow rates detected through each of the installed injectors;

said control means receiving said output signals and being adapted to (i) associate the output signals with each respective injector, (ii) compare the flows detected with accept/reject criteria, and (iii) determine accept/reject status of each of said injectors based on the fluid flow rates detected; and means connected to the housing and operably connected to said control means for providing visual accept/reject status indicia for each of the injectors.

2. A device as defined in claim 1 in which said accept/reject status indicia providing means includes lighted visual display means.

3. A device as defined in claim 1 in which said injectors are adapted to operate according to a predetermined flow schedule, said determining means being adapted to compare the fluid flow rate detected with said predetermined flow schedule and to identify those injectors with a flow rate greater than a predetermined deviation from said predetermined schedule as having a reject status.

4. A device as defined in claim 3 further comprising means operably connected with said determining means for delivering a flow of cleaning fluid to at least those injectors having a reject status.

5. A device as defined in claim 1 in which said control means is adapted to determine the average flow rate through the injectors and to identify those injectors with a flow rate greater than a predetermined deviation from said average as having a reject status.

6. A device as defined in claim 5 further comprising means operably connected with said determining means for delivering a flow of cleaning fluid to at least those injectors having a reject status.

7. A service device for use with fuel injectors, said device comprising:

a fluid manifold having an inlet opening and having a plurality of outlet openings in fluid communication with said inlet opening;

electric power means operatively associated with said injectors;

coupling means connected to said outlet openings, said coupling means being adapted to releasably receive said injectors;

a reservoir of cleaning fluid;

a pump having inlet tube means connected to said reservoir for drawing fluid therefrom, said pump further having outlet tube means in communication with the inlet of said manifold to provide a flow of cleaning fluid to said injectors;

pressure control valve means operably connected to said outlet tube means;

a flow meter connected in-line in said outlet tube means, said flow meter being adapted to detect the flow rate of fluid to said manifold and to produce an electrical output signal associated with the flow rate detected;

display means operably associated with said flow meter, said display means being adapted to display the detected flow rate based on said output signal;

an electronic controller operably connected with said electric power means and said injectors, said controller being adapted to energize each of said injectors one at a time, and means for associating each detected flow rate with the injector associated with such fluid flow and resulting in each said electrical output signal so as to enable correlation of each injector with its respective fluid flow.

8. A service unit as defined in claim 7 in which said electric power means includes a common electrical return from said injectors, said device further comprising (i) current sensing means connected in series with said return, said sensing means being adapted to detect the electric current flowing through said return, and means for associating the electric current detected with the injector associated with such current so as to enable correlation of each injector with its respective current draw.

9. A service unit as defined in claim 8 further comprising current display means operably associated with said current sensing means and said current associating means for displaying the current flow through each of said injectors.

10. A device as defined in claim 7 in which said controller is adapted to selectively operate in one of a testing mode of operation to establish fluid flow and current draw performance for each injector and a clean mode of operation, said controller (i) being operably connected to said flow meter for receiving said electrical output signal and to said current sensing means, and (ii) including said flow associating means and said current associating means, said device further comprising (i) a manually operable switch adapted to select between said testing and said cleaning modes of operation, and (ii) printer means connected to said controller, said controller being further adapted to cause the printing of the flow rate associated with each injector detected during said testing mode of operation.

11. A device as defined in claim 10 in which said cleaning mode of operation includes said testing mode of operation.

12. A device as defined in claim 10 in which said controller is further adapted to determine accept/reject status for each injector based on said output signal associated with each injector and to cause the printing of such status for each injector.

13. A method for testing fuel injectors, said method comprising the steps of:

providing:

(i) coupling means having a plurality of positions for each releasably receiving an injector therein, and (ii) means for supplying pressurized fluid to the inlet of said positions, said coupling means being adapted to normally prevent fluid flow through said positions, and being further adapted to permit fluid flow through those positions having an injector installed therein;

installing injectors into selected ones of said positions;

determining in which of said positions potentially operational injectors are installed;

operating said potentially operational injectors;

sensing the flow rates through said potentially operational injectors;

generating electrical output signals associated with the sensed flow rates through said potentially operational injectors;

said operating, sensing, and generating steps being performed simultaneously on each of said potentially operational injectors; and displaying visually perceptible flow rate data indicia in response to said electrical output signals.

14. A method as defined in claim 13 in which said displaying step includes recording the indicia onto fixed medium.

15. A method as defined in claim 13 in which said determining step includes the steps of detecting the presence of either an electrical open condition and an electrical shorted condition in said injectors.

16. A method as described in claim 13 further including the step of providing electronic digital controller means adapted for controlling and sequencing said determining and actuating steps.

17. A method as defined in claim 13 further including the steps of providing electric power means operably connected to said injectors, measuring the current draw through said injectors during said operating step, and displaying visually perceptible current draw data indicia in response to said measuring step.

18. A method for testing and cleaning fuel injectors, said method comprising the steps of:

providing apparatus comprising:

(i) means for releasably receiving injectors into a predetermined number of positions, said receiving means including a fluid manifold having an inlet opening and a plurality of outlet openings at said positions, said receiving means further including coupling means connected to said outlet openings for releasably receiving injectors, (ii) a reservoir of cleaning fluid, (iii) pump means for supplying pressurized cleaning fluid to the inlet of said positions, (iv) electric power means, (v) electronic controller means connected to said electric power means, and (vi) switch means operable connected to said controller means;

installing injectors into selected ones of said positions;

actuating said switch means after said installing step;

operating one of said injectors in a first of said positions for a first period of time, said operating step including (i) operably associating said one injector with said electric power means for energizing said one injector, and (ii) supplying pressurized cleaning fluid to said one injector;

generating an electrical signal correlating to the flow rate through said one injector during said period of time;

repeating said operating and said generating steps for each of said installed injectors, said repeating step including the step of determining when all of said injectors have been operated; and displaying visually perceptible flow rate data indicia correlating to each of said electrical signals;

said controller means being adapted (i) to sense said actuating step, (ii) to control said operating and said repeating steps, and (iii) to execute said determining step in response thereto.

19. A method as defined in claim 18 further including the step of communicating said electrical signals to said controller means, said controller means being adapted to control said displaying step in response thereto.

20. A method as defined in claim 18 further comprising the steps of checking for the presence of a potentially operational injector in said first position prior to said operating step, and repeating said checking step for each of said positions, said operating step being repeated only in those positions where a potentially operational injector has been detected.

21. A method as defined in claim 18 further comprising the step of storing the values of said electrical signals, manipulating said values for determining accept/reject status of said injectors according to predetermined acceptance criteria, and providing visual indicia of said status for each of said injectors.

22. A method as defined in claim 18 in which said switch means is adapted for selective actuation between first and second operative positions, said controller means being adapted for operation between testing and cleaning modes of operation in response to said first and second switch positions, respectively, said testing mode of operation including said operating, generating, repeating and displaying steps, said cleaning mode of operation including the steps of operating said injectors for a second predetermined period of time greater than said first predetermined period of time, and cycling through said testing mode of operation.

23. A method as defined in claim 22 further comprising the step of storing the values of said electrical signals generated during said testing mode of operation, manipulating said values for determining accept/reject status of said injectors according to predetermined acceptance criteria, and displaying visual indicia of the status for each of said injectors.

24. A method as defined in claim 23 further comprising the step of automatically repeating said cleaning mode of operation if the performance status of any of said injectors is rejected according to said determining step.

25. A method as defined in claim 24 further comprising the step of providing means for limiting the number of times said cleaning mode is automatically repeated.

26. A method as defined in claim 23 further comprising the step of disabling injectors having an acceptable performance status from said automatically repeating step.

27. A method as defined in claim 18 further comprising the steps of measuring the current draw through said injectors during said operating step, and displaying visually perceptible current draw data indicia in response to said current measuring step.

28. A service device for use with fuel injectors, said device comprising:

means for releasably receiving a plurality of said injectors;

means communicating with said receiving means for delivering a supply of pressurized fluid to said injectors;

electrical power means operably associated with said injectors;

control means operably associated with said electric power means and said injectors for selectively operating said injectors;

means for detecting the fluid flow rate through said injectors, said flow detection means being adapted to provide an electrical output signal associated with the fluid flow rate detected;

means receiving said output signal for determining accept/reject status of said injectors based on the fluid flow rate detected; and means operably connected to said determining means for providing visual accept/reject status indicia, said determining means being adapted to determine the average flow rate through the injectors and to identify those injectors with a flow rate greater than a predetermined deviation from said average as having a reject status.

29. A device as defined in claim 28 further comprising means operably connected with said determining means for delivering a flow of cleaning fluid to at least those injectors having a reject status.

30. A device as defined in claim 1 in which said accept/reject status indicia providing means is adapted to visually display the flow rates detected.

31. A device as defined in claim 1 in which said accept/reject status indicia providing means includes providing a printed record.

* * * * *